D. E. CARPENTER.
ELECTRODE ADJUSTING MEANS.
APPLICATION FILED FEB. 5, 1914.
1,162,031.
Patented Nov. 30, 1915.
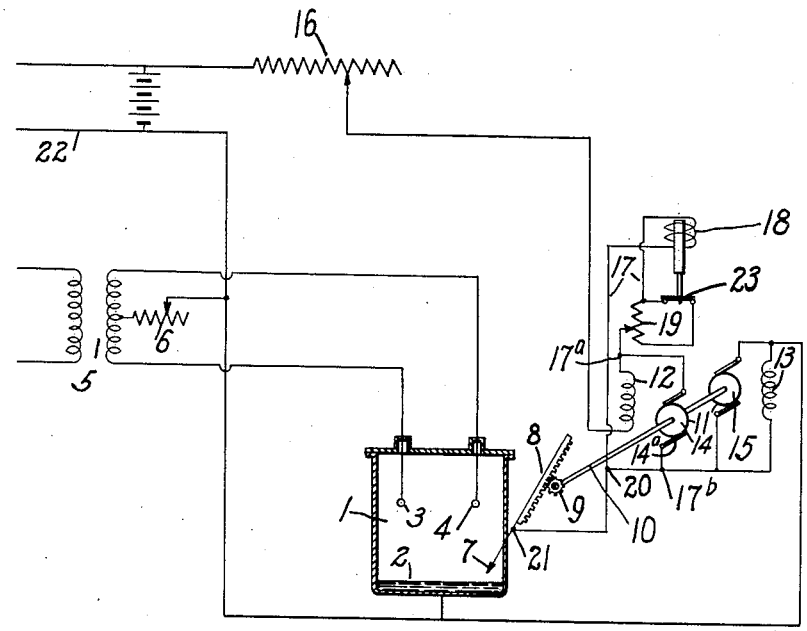
WITNESSES:
INVENTOR
David E. Carpenter
BY
Wesley G. Carr
ATTORNEY

UNITED STATES PATENT OFFICE.

DAVID E. CARPENTER, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRODE-ADJUSTING MEANS.

1,162,031.  Specification of Letters Patent.  Patented Nov. 30, 1915.

Application filed February 5, 1914.  Serial No. 816,839.

*To all whom it may concern:*

Be it known that I, DAVID E. CARPENTER, a citizen of the United States, and a resident of Wilkinsburg, in the county of Allegheny and State of Pennsylvania, have invented a new and useful Improvement in Electrode-Adjusting Means, of which the following is a specification.

My invention relates to automatic adjusting means for electrodes, and it has particular reference to the adjustment of electrodes between which an arc is established, its object being to provide automatically for initially establishing the arc, maintaining it at a predetermined length, renewing it when it is extinguished, and compensating for the burning away of the electrodes.

In general, my invention comprises the use of a motor so connected to the electrode to be adjusted that variations in the current in, and voltage across, the arc and through the motor will cause the movable electrode to approach or recede from the other electrode.

My invention is particularly applicable to vapor current rectifiers of high capacity, and I have shown an arrangement embodying the principles of my invention in the accompanying drawing, the single figure of which is a diagrammatic representation of a mercury vapor rectifier equipped with my improved means for actuating its starting and keeping-alive electrode.

Referring to the drawing, the rectifier 1 is provided with a vaporizable cathode 2, which may be of mercury, and two main anodes 3 and 4 that receive alternating current from a transformer 5 having connection to any suitable alternating current source. The rectifier delivers direct current from the cathode to any suitable load, which is diagrammatically represented by a variable resistance element 6. In addition to the main anodes 3 and 4, the rectifier has an auxiliary starting and keeping-alive anode 7, which is shown connected by a rack 8 and a pinion 9 to the shaft 10 of a motor 11. Any other suitable connecting means between the electrode and the motor may obviously be employed.

The motor 11 has a series field winding 12, a shunt field winding 13 and two distinct armature windings 14 and 15 which correspond, respectively, to the series and shunt field windings and are connected to two distinct commutators. Direct current is supplied to the keeping-alive circuit, which includes the motor, from any suitable source, and this direct current passes first through a variable resistance element 16, then through the series field winding 12, and then through the series armature winding 14. A shunt circuit 17 is interposed in parallel with the series armature 14, being connected to the armature leads at the points $17^a$ and $17^b$. A relay solenoid 18 is inserted in the shunt circuit 17, a suitable resistor 19 being connected in parallel with the relay terminals. Electric connection is made between the shunt circuit 17 and the keeping-alive electrode 7. As shown on the drawing, this connection extends between the point 20 in the shunt circuit and the point 21 of the keeping-alive electrode. The shunt circuit 17, including the relay solenoid 18, may be omitted from my system, but I prefer to employ it in order to secure quicker and more sensitive electrode adjustment in response to current and voltage changes.

From the negative brush $14^a$ of the series armature 14, the current divides. Most of it passes through the keeping-alive arc and the remaining part passes through the shunt armature 15, and the shunt field winding 13, and thence to the main direct current lead 22 from the rectifier, from which connection is made to the negative terminal of the independent direct current source referred to above.

The motor windings are so arranged that the series windings tend to turn the armature shaft in the direction to raise the electrode 7, while the shunt windings tend to turn the armature shaft to lower the electrode. In accomplishing this, the series and shunt field windings 12 and 13 are so wound as to produce magnetic fields in the common iron circuit which are in the same direction, or are mutually strengthened, while the armature windings 14 and 15 are so wound as to oppose each other, or, in other words, they mutually tend to produce a zero magnetizing force in the common iron circuit, under proper conditions of current in the arc and of voltage across it. When, however, the keeping-alive electrode is very close to the cathode, the current in the arc high, and the voltage across it constant or slightly lower than normal, the magnetization of the armature windings will be unbalanced, and the magnetic field caused by the higher current in the series armature winding 14 will predominate. On the other hand, when the keeping-alive electrode is too high, the current in the arc low, and the voltage across it higher than normal, the armature windings will again be unbalanced, and the shunt armature winding 15 will generate the predominating field. It will be seen from this that the direction of rotation which the magnetic forces will tend to produce in the latter instance will be in the opposite direction from that in the former, and when there is no magnetizing force in the armature windings, there will be no force tending to produce rotation.

When the rectifier is to be started, the parts may be assumed to be in the relation shown on the drawing, the keeping-alive electrode being raised from the mercury cathode and no arc existing between them. Potential is applied from the independent direct current source, and since, as stated, the keeping-alive electrode is not in contact with the cathode, the potential builds up between the keeping-alive electrode and the cathode, and thus is applied to the shunt windings of the motor, causing a current to flow through the shunt armature and field of the motor, which, in turn, makes the motor shaft turn in the proper direction to lower the keeping-alive electrode until contact is made between it and the cathode. When this contact is established, the voltage between the keeping-alive electrode and the cathode, and hence across the shunt windings of the motor, will be reduced to zero, and a relatively heavy current will flow through the series windings of the motor and will cause the motor shaft to rotate in the opposite direction and raise the keeping-alive electrode from the cathode. When its mechanical contact with the cathode is broken, an arc will be formed, which will pass the desired amount of current and will have the required voltage drop across it. As will be understood, this means that the current in the circuit including the series windings of the motor will be decreased, and the voltage across the arc will be applied to the shunt windings of the motor. This decrease of current will tend to make the series armature magnetic force decrease, and the voltage on the shunt windings will cause a current in the shunt armature which will oppose the series armature magnetic force, thus establishing a state of equilibrium. When this equilibrium is disturbed by the keeping-alive arc becoming short circuited by a wave of mercury or otherwise, or by the electrode burning or melting away, the motor will operate in such a way as to reestablish equilibrium.

The relay solenoid 18 and the shunt circuit 17 assist in maintaining equilibrium by causing the motor to respond at once to very slight changes in the current and voltage across the keeping-alive arc. Thus, when the shunt characteristic of the motor predominates sufficiently to lower the electrode until an increased current is caused to flow through the auxiliary shunt circuit 17, the solenoid 18 is thereby actuated, thus breaking the circuit at 23 and putting the variable resistor 19 in series with the shunt circuit 17. The resistance so inserted is sufficiently great to cause most of the current at this time to pass immediately through the series armature 14 and this will cause the motor shaft to rotate in the opposite direction to raise the starting electrode 7. As the starting electrode recedes from the mercury cathode, the resistance between them increases, and this resistance is soon sufficient to weaken the current in the shunt circuit 17 and cause the relay solenoid 18 to be released, thus remaking the contact at 23, and weakening the current through the series armature.

The series windings and the shunt windings must be so designed that, when normal current is flowing across the keeping-alive arc they will oppose each other almost equally. I prefer that the shunt characteristic shall be slightly stronger than the series characteristic, so that the keeping-alive electrode will always tend to descend at a very slow rate. When, however, there is a drop in the voltage across the keeping-alive arc, or when the keeping-alive electrode makes direct contact with the mercury, which will occasionally happen by reason of waves on the surface of the mercury, the sudden increase of current at this point will operate the relay to open the contact at 23, send most of the current through the series armature 14, and raise the keeping-alive electrode until the relay again closes the contact at 23.

The series windings and the shunt windings may obviously be disposed in separate motors, connected in operative relation to the movable electrode by any suitable mechanism.

My invention is not restricted to the adjustment of rectifier electrodes nor is it restricted to the precise structural details which I have shown and described. It is obvious that the principles of my invention may be applied to the adjustment of any electrodes where it is desired that the relative position of an electrode be varied in accordance with current and voltage variations.

I claim as my invention:

1. Electrode adjusting means comprising a pair of electrodes, one of which is movable, a motor having shunt field and armature windings tending to rotate the armature shaft in one direction and series field and armature windings tending to rotate the armature shaft in the opposite direction, means for operatively connecting the motor to the movable electrode, means for energizing the respective motor windings to maintain a substantially constant distance between the electrodes, said means comprising a source of direct current, and leads for conducting the direct current to the respective sets of windings, a relay connected in parallel between the terminals of the series armature winding, a resistance element connected in parallel across the relay terminals, and an electrical connection between the relay and the movable electrode.

2. The combination with an electromagnetic operating device arranged to control the current in its own circuit, of means for increasing the sensitiveness of operation thereof comprising a shunt circuit embodying a resistance member connected around said device, and an electromagnetically operated switch having its actuating solenoid connected to be energized by current in the circuit to be controlled and having its contacts arranged to short circuit said resistance member upon a decrease in current and to open said short circuit upon an increase in current.

In testimony whereof, I have hereunto subscribed my name this 31st day of Jan. 1914.

DAVID E. CARPENTER.

Witnesses:
L. E. FROST,
B. B. HINES.